US010029836B2

United States Patent
Danenberg et al.

(10) Patent No.: US 10,029,836 B2
(45) Date of Patent: Jul. 24, 2018

(54) ANIMAL FEED COVERS AND SYSTEMS AND METHODS FOR THEIR PRODUCTION AND USE

(71) Applicant: PURINA ANIMAL NUTRITION LLC, Shoreview, MN (US)

(72) Inventors: Benjamin R. Danenberg, White Bear Lake, MN (US); Michael J. Gabriel, Inver Grove Heights, MN (US); Michael S. Burr, Marthasville, MO (US)

(73) Assignee: PURINA ANIMAL NUTRITION LLC, Shoreview, MN (US)

( * ) Notice: Subject to any disclaimer, the term of this patent is extended or adjusted under 35 U.S.C. 154(b) by 84 days.

(21) Appl. No.: 14/815,488

(22) Filed: Jul. 31, 2015

(65) Prior Publication Data

US 2017/0029183 A1 Feb. 2, 2017

(51) Int. Cl.
*B65D 65/02* (2006.01)
*B65B 25/00* (2006.01)
(Continued)

(52) U.S. Cl.
CPC .............. *B65D 65/02* (2013.01); *A23K 40/30* (2016.05); *A23P 10/00* (2016.08); *B32B 1/00* (2013.01);
(Continued)

(58) Field of Classification Search
CPC ........ B65D 53/06; B65D 65/02; B65D 65/14; B65D 65/38; B65D 65/40; B65D 85/72;
(Continued)

(56) References Cited

U.S. PATENT DOCUMENTS

| 1,343,013 A | * | 6/1920 | Taliaferro | .......... B65D 43/0218 215/324 |
| 1,555,529 A | * | 9/1925 | Taylor | .................... B65D 51/20 215/233 |

(Continued)

FOREIGN PATENT DOCUMENTS

| JP | 2007191221 A | 8/2007 |
| JP | 20138006607 A | 1/2013 |
| WO | 0301323 A1 | 2/2003 |

OTHER PUBLICATIONS

Lid NPL, published Nov. 24, 2013, https://forum.bodybuilding.com/showthread.php?t=158480883.*

(Continued)

*Primary Examiner* — Drew E Becker
*Assistant Examiner* — Bryan Kim
(74) *Attorney, Agent, or Firm* — Dorsey & Whitney LLP

(57) ABSTRACT

Covers for sealing and/or bonding with an exposed surface of an animal feed within a container include a flexible film that conforms to the animal feed and a rigid or semi-rigid layer that allows the cover to be handled by an operator during placement of the cover over the animal feed composition while the composition is at elevated temperatures. The polymer film may include a heat-activated coating that establishes a bond with the animal feed when the feed is at elevated temperatures or when an external heat source is applied to the cover. The heat-activated coating may be flowable at a temperature of at least about 125° F. Upon placement of the cover over the animal feed, the film conforms to the exposed surface of the feed and the cover forms a seal with the animal feed as flowable coating reaches a flowable temperature.

9 Claims, 8 Drawing Sheets

(51) Int. Cl.
| | |
|---|---|
| *B65B 7/28* | (2006.01) |
| *B65D 85/72* | (2006.01) |
| *A23K 40/30* | (2016.01) |
| *A23P 10/00* | (2016.01) |
| *B32B 7/02* | (2006.01) |
| *B32B 7/12* | (2006.01) |
| *B32B 27/06* | (2006.01) |
| *B32B 27/08* | (2006.01) |
| *B32B 27/10* | (2006.01) |
| *B32B 29/00* | (2006.01) |
| *B32B 29/08* | (2006.01) |
| *B32B 1/00* | (2006.01) |
| *B32B 3/26* | (2006.01) |
| *B32B 3/28* | (2006.01) |

(52) U.S. Cl.
CPC ............... *B32B 3/266* (2013.01); *B32B 3/28* (2013.01); *B32B 7/02* (2013.01); *B32B 7/12* (2013.01); *B32B 27/06* (2013.01); *B32B 27/08* (2013.01); *B32B 27/10* (2013.01); *B32B 29/002* (2013.01); *B32B 29/08* (2013.01); *B65B 7/2842* (2013.01); *B65B 25/001* (2013.01); *B65D 85/72* (2013.01); *B32B 2255/10* (2013.01); *B32B 2255/24* (2013.01); *B32B 2307/724* (2013.01); *B32B 2307/726* (2013.01); *B32B 2307/732* (2013.01); *B32B 2307/746* (2013.01); *B32B 2435/02* (2013.01); *B32B 2439/70* (2013.01)

(58) Field of Classification Search
CPC . B65B 25/001; B65B 7/2842; B65B 2439/70; B65B 65/02; B65B 85/72; B32B 1/00; B32B 3/266; B32B 3/28; B32B 7/02; B32B 7/12; B32B 27/06; B32B 27/08; B32B 27/10; B32B 29/002; B32B 29/08; B32B 2255/10; B32B 2255/24; B32B 2307/724; B32B 2307/726; B32B 2307/732; B32B 2307/746; B32B 2435/02; B32B 2439/70; A23K 40/30; A23K 40/35; A23P 10/00; A23P 20/00; A23P 20/10; A23P 20/11; A23B 4/10; A23B 5/06; A23B 5/065; A23B 7/16; A23B 9/14

USPC .................. 426/53, 54, 623, 630, 635, 805; 220/359.1, 359.4
See application file for complete search history.

(56) References Cited

U.S. PATENT DOCUMENTS

| | | | | |
|---|---|---|---|---|
| 2,141,833 | A | * | 12/1938 | Young .................... B65D 41/14 215/326 |
| 3,230,093 | A | * | 1/1966 | Albertus ............. B65D 77/2012 220/270 |
| 3,233,815 | A | | 2/1966 | Eggen |
| 3,980,200 | A | * | 9/1976 | Klein ................... B65D 17/161 220/268 |
| 4,431,675 | A | * | 2/1984 | Schroeder .............. A23K 40/20 426/623 |
| 4,542,029 | A | | 9/1985 | Caner et al. |
| 4,803,085 | A | | 2/1989 | Findley |
| 4,933,193 | A | * | 6/1990 | Fisher ................ B65D 81/3453 206/497 |
| 6,511,688 | B2 | | 1/2003 | Edwards et al. |
| 6,777,019 | B1 | | 8/2004 | Thornberg |
| 2011/0100854 | A1 | * | 5/2011 | Chapin ................ B65D 17/165 206/459.5 |

OTHER PUBLICATIONS

International Search Report and Written Opinion dated Nov. 14, 2016 for International Application No. PCT/US2016/044419.
Product Data Sheet—Multiwax® ML 445 H, Sonneborn Refined Products, Sep. 11, 2012.
Plastic Films in Food Packaging: Materials, Technology and Applications, Sina Ebnesajjad, William Andrew, Dec. 31, 2012, p. 5 (4-methylpentene-1-Based Polyolefin (top) and polyester(bottom)), p. 57 (biaxially oriented films).
Partial European Search Report dated Jan. 23, 2017 for European Application No. 16181967.7.
Completed Extended European Search Report dated Apr. 25, 2017 for European Application No. 16181967.7.

* cited by examiner

ANIMAL FEED COVERS AND SYSTEMS AND METHODS FOR THEIR PRODUCTION AND USE

CROSS-REFERENCE TO RELATED APPLICATIONS

This application relates to two design patent applications filed concurrently herewith, one having the title "ANIMAL FEED TUB COVER," and application Ser. No. 29/534,880, and the other having the title "ANIMAL FEED TUB AND COVER," and application Ser. No. 29/534,874, the contents of which are incorporated by reference herein in their entirety.

TECHNICAL FIELD

Covers for animal feed products and systems and methods for their production and use are provided. Such covers form a seal with an exterior layer of an animal feed composition within a container.

BACKGROUND

Animal feed products, such as animal feed blocks, provide animals with dietary nutrients helpful in maintaining and improving animal health. Some of these products may be held within a container, such as a feed tub, for use in free choice settings. Animal feed tubs typically contain between 50 to 500 pounds of the animal feed product. The tubs may contain animal feed block compositions that may be consumed by licking or nibbling at the animal feed product. The tubs may be positioned in locations accessible to the animals such as pasture, ranches, ranges and may be replaced periodically, such as at regular intervals or after the product contained within tub is completely or partially consumed.

Producing animal feed products held within containers can present challenges related to moisture loss from, and damage to, the animal feed products prior to offering to animals.

SUMMARY

Implementations provide covers for sealing with a surface of an animal feed held within a container. The covers are configured with a flexible film that conforms to the surface of the animal feed, which commonly includes irregular surface structures. A rigid or semi-rigid layer of the cover may be laminated or otherwise adhered to the flexible film. The film may be sized and shaped to extend beyond an outer periphery of the rigid or semi-rigid layer.

In one implementation, a method of covering an animal feed involves depositing in an open end of a container an animal feed that utilizes an exothermic reaction for hardening, placing a cover on an exposed surface of the feed at the open end of the container, where the cover includes a flowable coating arranged on one side of a flexible film and a rigid or semi-rigid layer arranged on an opposite side of the film. The flexible film conforms to the exposed surface of the feed and the cover forms a seal with the animal feed undergoing the exothermic reaction upon the flowable coating reaching a temperature of at least about 125° F.

In various implementations and alternatives, an outer circumference of the film is substantially similar to an inner circumference of the open end of the container such that the film contacts, or is proximate, a circumferential sidewall of the container upon placement of the cover on the exposed surface of the feed product. In such cases, the film may be larger relative to the rigid or semi-rigid layer, and the film and the rigid or semi-rigid layer may be concentrically arranged. The film may include a plurality of radial slits or notches arranged along an outer circumference and may facilitate the film conforming to the exposed surface of the feed product, such as at the outer circumference of the container, and the film and the rigid or semi-rigid layer may be concentrically arranged.

In various implementations and alternatives, the cover is removable. In such cases, the flowable coating may be adapted to be carried with the cover upon removal of the cover. In addition or alternatively, the flowable coating may be adapted to remain on the feed upon removal of the cover.

In another implementation, a method of covering an animal feed involves depositing an animal feed in an open end of a container; placing a cover on an exposed surface of the feed at the open end of the container, where the cover includes a flowable coating arranged on one side of a flexible film and a rigid or semi-rigid layer on an opposite side of the film; and applying heat to the cover to cause the flowable coating to reach a flow temperature of at least about 125° F. The flexible film conforms to the exposed surface of the feed and the cover forms a seal with the animal feed upon the flowable coating reaching the flow temperature.

In one embodiment, a cover for covering an animal feed held within a container includes a flexible film; a coating arranged on one side of the film; and a rigid or semi-rigid layer joined to a portion of an opposite side of the film. According to certain implementations, the rigid or semi-rigid layer is more rigid than the film, is concentrically arranged relative to the film, and the film has a larger size relative to a size of the rigid or semi-rigid layer.

In various implementations and alternatives, the coating is flowable at a temperature of about 125° F. The flowable coating may be wax. The film may include a plurality of radial slits or notches arranged along an outer circumference. In some cases, the plurality of radial slits or notches may terminate at a boundary where an external circumference of the rigid or semi-rigid layer couples to the film. In some implementations and alternatives, the film is semi-permeable to water and/or gasses or may be water and/or gas impermeable or combinations thereof. In addition or alternatively, the film is non-heat-shrinkable.

DETAILED DESCRIPTION

Figure 1:
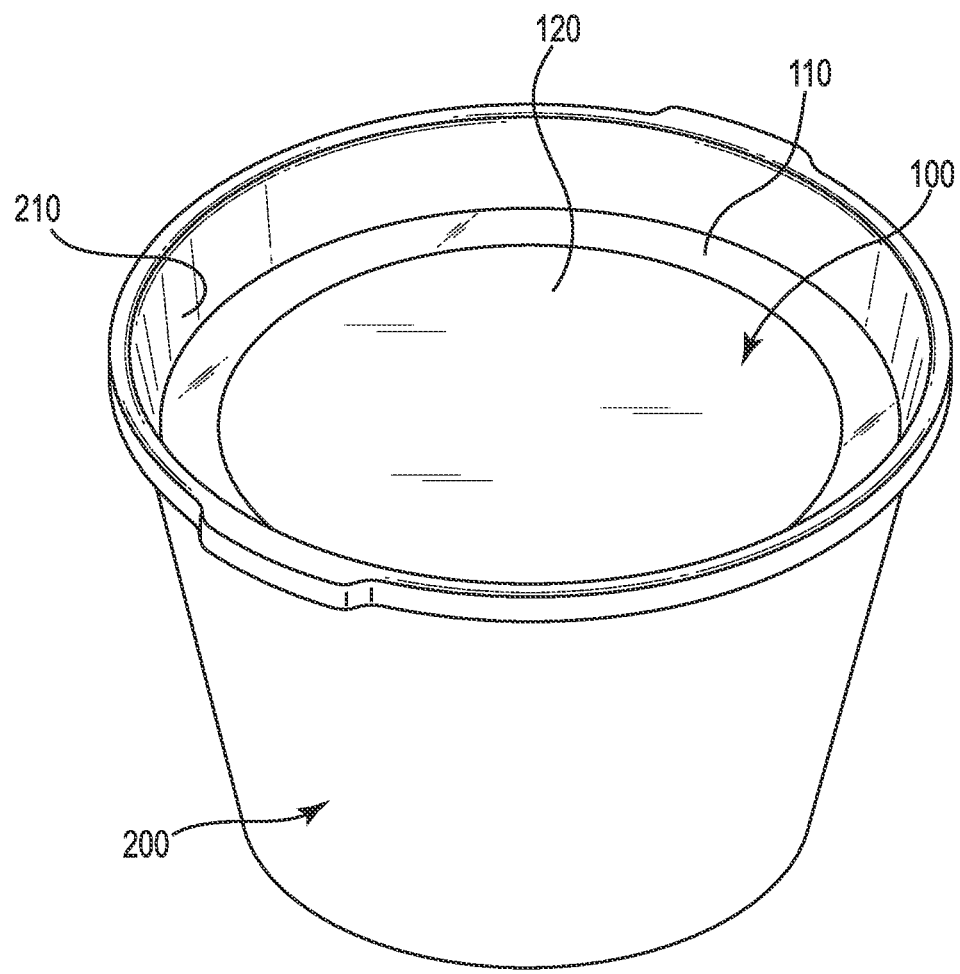
FIGS. 1-3 illustrate a first embodiment of a cover according to certain implementations.

In prior approaches, the open end of feed containers holding animal feed products were covered with a corrugated cardboard layer board or a polyethylene (PE) film layer to facilitate shipping and handling of the product. Either the corrugated or the PE layer was positioned atop the animal feed products when such products were at or near ambient temperature (e.g., 70 to 100° F.). Prior to placement in the field, the layer was removed so as to provide animals access to the feed within the container. Such layers, while facilitating shipping and handling, do not form a seal with the animal feed, nor do they protect the animal feed against moisture loss or mechanical damage.

Implementations provide covers for feed containers and methods for the production of the covers and their use. The covers for the feed containers may be composed of layers and coatings to facilitate protecting the animal feed; and forming a seal between the animal feed and the cover, or a layer thereof, in order to prevent or minimize moisture loss from the animal feed. The cover may include, but is not limited to: one or more films, coatings, primers, semi-rigid or rigid layers and/or laminates/adhesives in any order or combination. Some or all of the components may be adapted to withstand, at least temporarily, high temperatures and/or exposure to moisture.

Films: One or more films may provide the cover with a flexible layer that enables the film to conform to irregular surface structures commonly found on an exterior surface of an animal feed. The film may be composed of polymers such as polyethylene (PE), polypropylene (PP) oriented polyethylene (OPET), polystyrene (PS), polyvinyl chloride (PVC), polyamide (PA), low density polyethylene (LDPE), ethylene vinyl acetate (EVA), polyvinylidene chloride (PVDC), saponified or hydrolyzed copolymer of ethylene and vinyl acetate (EVOH), ethylene acrylic acid (EAA),4-methylpentene-1-based polyolefin, and biaxially oriented (BO) polymer films including BOPP, BOPET, BOPS, BOPVC, BOPA, cellophane, regenerated cellulosic film, other flexible polymers or starch-based films (e.g., corn-based films and a polylactic acid (PLA) bio-based films) and combinations. Such films may be a laminate of multiple film layers. In addition, as described herein, the film may be coated and/or may be laminated with other non-film layers. In addition or alternatively, food grade components such as starch may be included on or within the film. A thickness of the film may range from about 0.1 to about 5 mils. The film may be water impermeable or moisture resistant, may be gas impermeable or semi-permeable and combinations thereof. In some instances, the film may not be heat-shrinkable.

In certain implementations, the film may be a wax-coated flexible web with or without a release coating. An exemplary film is Grade P0630 Protective Packaging Film manufactured by Bemis Company, Inc., which is a laminate of an OPET layer, a PE layer along with a wax layer and a release coating with a nominal film thickness of 3.8 mils, and moderate oxygen and moisture permeability.

Coating: One or more coatings may be present on at least one side of the film. The coating(s) may facilitate establishing a bond with the animal feed product; may add a moisture barrier to the cover; and/or may facilitate bonding film layers, films to coatings, or coatings to coatings. The coatings may be flexible and may withstand breaking or damage during handling of the polymer film. The coatings may include, but are not limited to: wax, such as microcrystalline wax and/or paraffin wax, rubber, aluminum distearate, ester gum and combinations.

In some implementations, at least one of the coatings is adapted to be heat-activated and bond with the animal feed at elevated temperatures. In this instance, the coatings may be flowable and may have a melting point of about 125° F. to about 175° F., or about 130° F. to about 160° F., or at least above about 125° F., 130° F., 135° F. or 140° F. and/or up to about 190° F. The flowability of the coating may be activated upon exposure to heat, such as heat generated by an exothermic reaction within the animal feed described below. In some implementations, the flowable coating may be a food grade wax that becomes molten at the preceding temperatures. Food grade waxes include microcrystalline waxes, paraffin waxes, blends of microcrystalline and paraffin wax, and may be blended with or without mineral oil (e.g., petrolatum).

An exemplary coating has been marketed as Parakote F624 manufactured by Marathon Corporation, which includes a mixture of 18 percent by weight of pale crepe rubber, 8 percent by weight of an ester gum, 44 percent by weight of a microcrystalline wax, e.g., amorphous wax, which has a melting point of 165° F., and 30 percent by weight of a paraffin wax which has a melting point of 145° F. The coating is semi-permeable, which assists in preventing excessive moisture loss. Other exemplary coatings are described in U.S. Pat. No. 3,233,815, which is incorporated by reference in its entirety for any useful purpose.

Primer: The primer may facilitate bonding or adhering the coating(s) to the film. In some implementations, the primer may facilitate retention of the coating(s) on the film during exposure to heat and/or moisture. Alternatively, the primer may facilitate releasing the coating(s) from the film so that it remains atop the animal feed upon removal of the film. The primer may be composed of polymers and/or waxes and may include cross-linking functionalities.

Rigid or semi-rigid layer: The rigid or semi-rigid layer may be present on one side of the polymer film. The rigid or semi-rigid layer may be disposed on the side of the film opposite the side with the coating adapted to contact the animal feed, when such a coating is present on the film. The rigid or semi-rigid layer may provide the cover with a level of rigidity needed for handling the cover during packaging of the animal feed in a container (e.g., feed tub). In addition, at least upon sealing the cover to the animal feed, the rigid or semi-rigid layer has a level of flexibility that enables the cover to be peeled-off by a user upon offering the feed within the container (e.g., feed tub) to animals. This layer may be constructed of paper such as paperboard (e.g., SBS (solid bleached sulfate) paperboard), may be corrugated, may be a polymer layer, and combinations. The layer may have a rigidity that is greater than a rigidity of the polymer film. The rigid or semi-rigid layer may have a thickness of about 10 to 24 pt., about 12 pt., about 14 pt., about 16 pt. about 18 pt., about 20 pt., and up to about 40 pt., 42 pt., 44 pt., or 46 pt., or in some implementations may be corrugated in all manners. The thickness of the layer may be thicker than the film. This size of this layer may be smaller than the polymer film and may have a shape similar to the shape of the polymer film and/or a feed tub opening.

Laminate/adhesive layer: The laminate (e.g., polymer laminate) or adhesive may facilitate binding the semi-rigid or rigid layer to the polymer film. This layer may be configured to withstand elevated temperatures such that the rigid or semi-rigid layer is bound to the polymer layer after the cover is deposited on the animal feed product. In some implementations, the laminate or adhesive layer may facilitate the easy removal of the rigid or semi-rigid layer from the polymer film after placement on the animal feed (e.g., at the time of readying the animal feed for use). Alternatively, the laminate or adhesive layer may continue to bond the rigid or semi-rigid layer to the polymer layer during cover removal such that at least the polymer layer and rigid or semi-rigid layer are simultaneously removed.

The cover may be constructed with a coating disposed on one side of the polymer film and a rigid or semi-rigid layer on the opposite side of the film. The coating may be bound directly to the polymer film, or optionally, a primer layer may facilitate binding the flowable layer with the polymer film. In a more particular example, the coating may be heat-activated and/or adapted to flow at high temperatures and may facilitate establishing a bond between the cover and the exterior surface of the animal feed product. In addition or alternatively, the coating may be positioned between film layers and one of the film layers may be adapted to contact the feed mixture and be heat and/or moisture-activated to facilitate establishing a bond between the cover and the animal feed product. For instance, such a layer may have the properties of the flowable coatings described herein but may be implemented as a film. The rigid or semi-rigid layer may be laminated or otherwise adhered to the polymer film in a suitable manner, by known means.

FIGS. 1 to 8 illustrate various embodiments of the covers according to certain implementations, in which common reference numbers represent common features among the figures.

Figure 2:
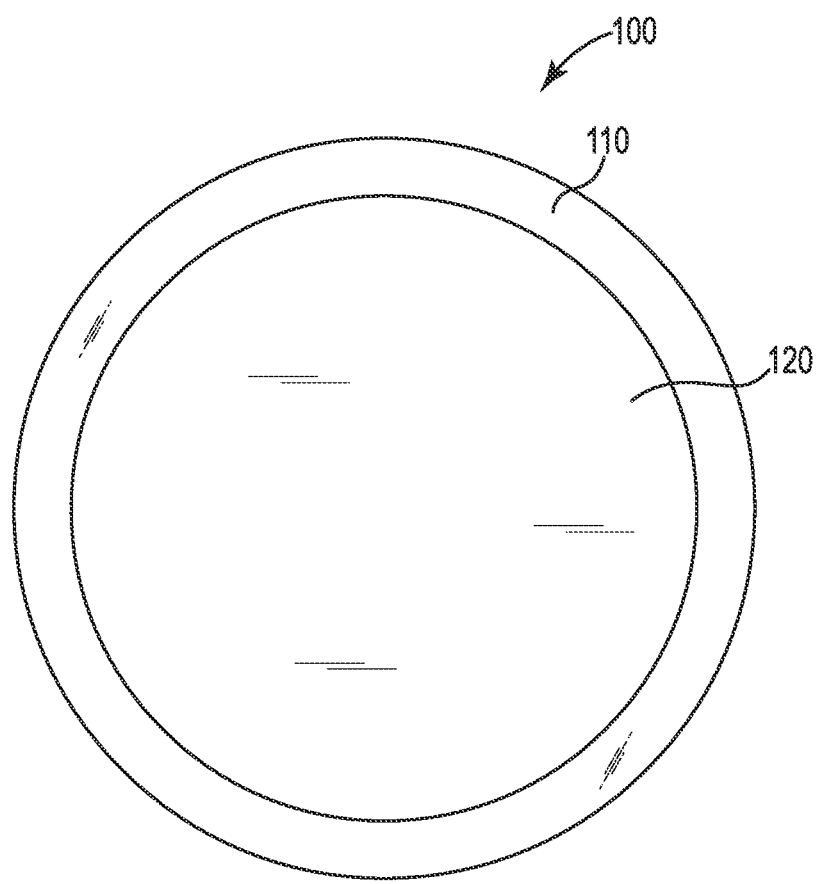
Figure 3:

FIGS. 1 through 3 illustrate a first embodiment of a cover 100 for use in connection with a feed tub 200. As illustrated in FIG. 1, the cover 100 is arranged within a feed tub 200 containing animal feed. The cover 100 includes a film layer 110 and a rigid or semi-rigid layer 120. The cover 100 is arranged within the tub 200 and an outer circumference of the cover 100 contacts or is adjacent to a circumferential sidewall 210 of the tub 200 proximate an upper end of the tub 200.

The shape of the cover 100, or a portion thereof, e.g., the film layer 110, may be shaped complementarily to the shape of an internal circumference of the feed tub 200. In the embodiment shown in FIGS. 1 through 3, both the film and the rigid or semi-rigid layers 110, 120 are circular-shaped, making the shape of the cover 100 complementary to the circular-shaped inner circumference of the feed tub 200. It will be appreciated that other feed tub configurations are available and the internal circumference of such tubs, and thus the cover 100, or portions thereof, may be of any suitable shape, and may include geometric shapes such as an oval, rectangle, triangle, square, pentagon, hexagon, heptagon, octagon and so on.

The film layer 110 may be dimensioned to fit within an internal circumference of the feed tub 200. The film layer 110 is flexible and the outer circumferential edge of the film layer 110 may abut, be directly adjacent to, or rest against the sidewall 210 of the tub 200. Because of its ability to conform to various surfaces, the external circumference of the film layer 110 need not be dimensioned exactly the same and the inner circumference of the feed tub 200, however, it is an object of the cover 100 to provide a protective layer over the contents of the container and thus it may be preferable that the external circumference be similar to or even complementary to the inner circumference of the feed tub 200 in an area where the cover is to be positioned so as to ensure the entire layer of animal feed is protected by the cover 100.

In the embodiment shown in FIGS. 1 through 3, an external circumference of the film layer 110 is substantially the same as an inner circumference of the feed tub 200 proximate a top end of the tub. In this implementation, the film layer 110 may abut the circumferential sidewall 210 of the tub. However, in an implementation where the feed tub 200 contains less animal feed than shown in FIG. 1, the cover 100 would be positioned lower within the tub and the external circumference of the film layer 110 may be larger than the inner circumference of the tub 200 resulting in the film layer 110 abutting with and bending and conforming to a portion of the circumferential sidewall 210 of the tub 200. Further, in implementations where the animal feed fills the tub to a higher level than shown in FIG. 1, the external circumference of the film layer 110 may be slightly smaller than an internal circumference of the tub 200 resulting in the film layer being arranged adjacent to the circumferential sidewall 210 but may not abut against it. Alternatively, the external circumference of the film layer 110 may be selected so that it at least abuts the internal circumference of the tub 200 at any fill height so as to ensure entirety of the animal feed is protected by the cover 100. In exemplary embodiments, a diameter of the film layer 110 may be about 16 to 26 inches and a diameter of the inner circumference of the feed tub 200 at a fill line for the animal feed (i.e., at a level within the tub where the cover 100 is positioned) may be about 16 to 25 inches.

The rigid or semi-rigid layer 120 provides the cover 100 with rigidity to assist an operator in placing the cover 100 atop animal feed contained within the feed tub 200, which may be at temperatures above 140 to 150° F. Accordingly, the shape of the rigid or semi-rigid layer may be of any suitable shape for handling the cover 100 such as the geometric shapes described in connection with the cover, ornamental shapes, irregular shapes and so on. As illustrated in FIGS. 1 through 3, the rigid or semi-rigid layer 120 of the cover 100 may be dimensioned such that it is smaller than the film layer 110. For instance, a total surface area of the rigid or semi-rigid layer 120 may be smaller than a total surface area of the film layer 110. In addition or alternatively, a shape of the rigid or semi-rigid layer 120 may be the same as the shape as the film layer 110 as illustrated in the embodiment of the cover 100 of FIG. 1; or the shapes of the semi-rigid layer 120 and the film layer 110 may differ. In exemplary embodiments, a diameter of the rigid or semi-rigid layer 120 may be about 12 to 24 inches.

In some implementations, a diameter of the rigid or semi-rigid layer, or a portion thereof, may be at least about two inches smaller than a diameter of the film layer 110. For instance, for a film layer with a 24 inch diameter, the rigid or semi-rigid layer may have a diameter of 22 inches. In other implementations, a diameter of the rigid or semi-rigid layer may be at least about four inches smaller than a diameter of the film layer 110 so that about two inches of the film layer 110 is exposed around the circumference of the cover 100. For instance, for a film layer with a 26 inch diameter, the rigid or semi-rigid layer may have a diameter of 22 inches.

The film layer 110 and the rigid or semi-rigid layer 120 of the cover 100 may be concentrically arranged. In addition, as shown in FIGS. 1 and 2, the rigid or semi-rigid layer 120 may overlay and be centered on the film layer 110. FIG. 3 illustrates a side view of the film layer 110 underlying and extending from the edges of the rigid or semi-rigid layer 120.

Figure 4:
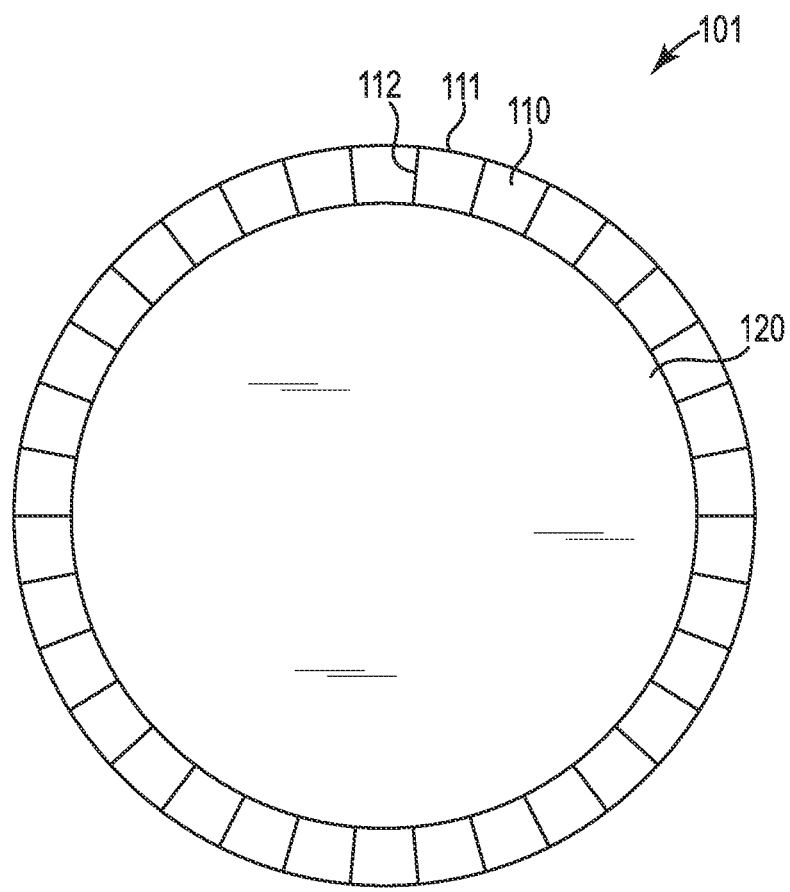
FIG. 4 illustrates a second embodiment of a cover according to certain implementations.

FIG. 4 illustrates a second embodiment of a cover 101. The cover 101 includes a film layer 110 and a rigid or semi-rigid layer 120 concentrically arranged. In this embodiment, the film layer 110 includes a plurality of tabs 111 defined by a plurality of radial slits 112 extending along the portion of the film layer 110 being exposed from the rigid or semi-rigid layer 120. The radial slits 112 may be evenly-spaced around an outer circumferential portion of the film layer 110. For instance, the slits 112 may be about 2 inches apart, resulting in the tabs 111 having a length of about 2 inches. A width of the tabs 111 may be about 2 inches and may be defined by the length the film layer 110 exposed from the rigid or semi-rigid layer 120. For instance, the slits 112 may terminate at a boundary where the rigid or semi-rigid layer 120 is joined to the film layer 110.

Figure 5:
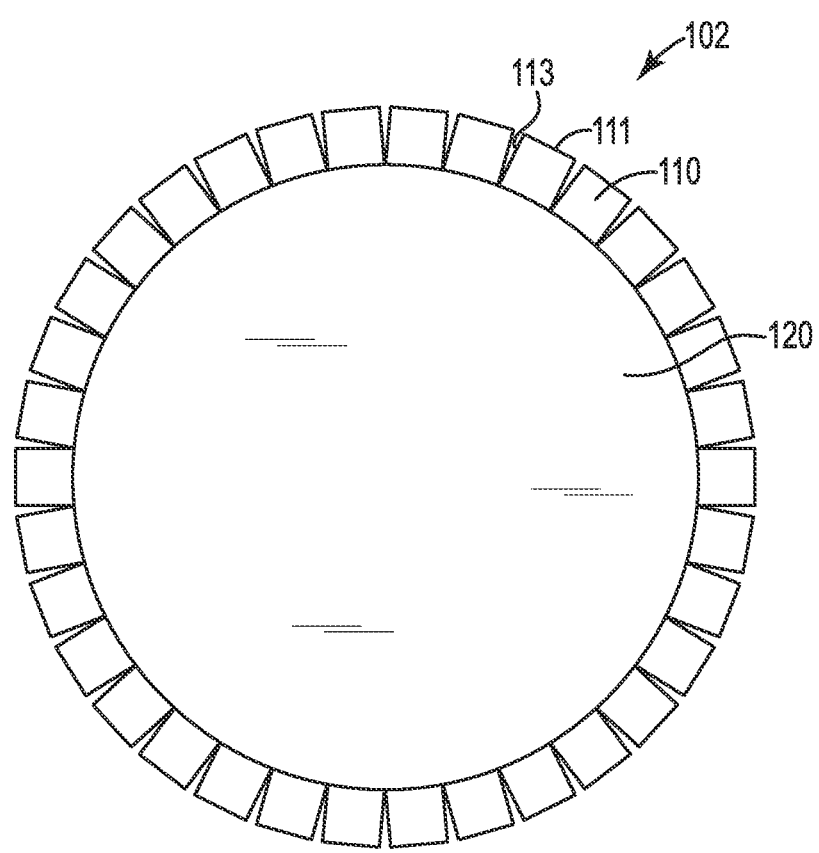
FIG. 5 illustrates a third embodiment of a cover according to certain implementations.

FIG. 5 illustrates a third embodiment of a cover 102. The cover 102 differs from cover 101 in that the plurality of tabs 111 are defined by a plurality of wedge-shaped notches 113 separating the tabs 111 instead of slits 112 as illustrated in FIG. 4. The wedge-shaped notches 113 defined by V-shaped cut-outs may be approximately 2 inches apart, resulting in the tabs 111 having a length of about 2 inches. In addition, a width of the tabs 111 may be about 2 inches, resulting in the tabs 111 having a substantially square shape. Due to being defined by notches 113, the outer edges of the tabs 111 are slightly spaced apart from one another.

Figure 6:
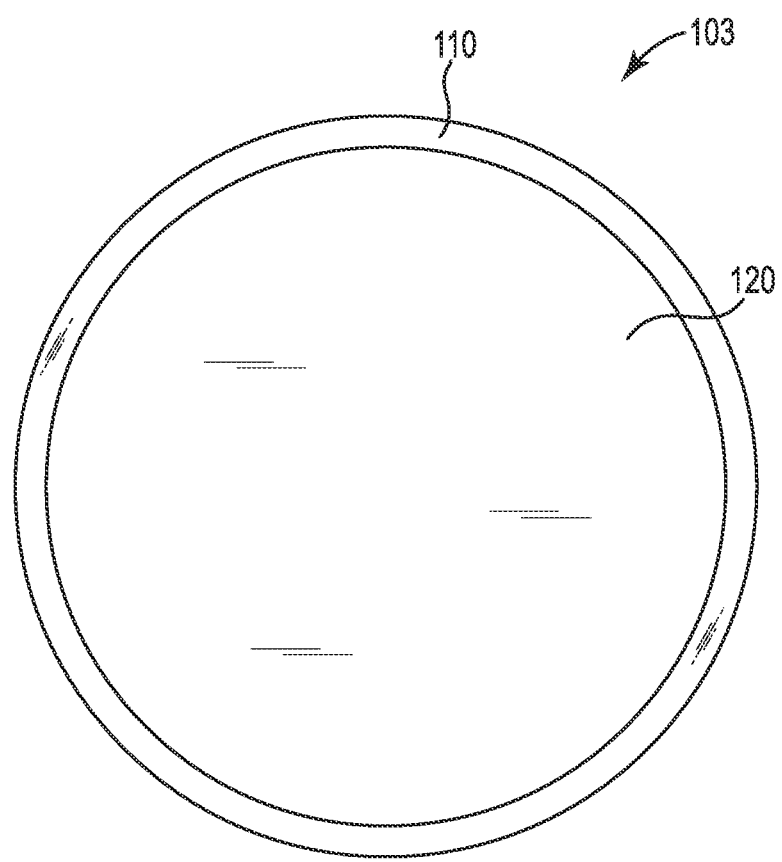
FIG. 6 illustrates a fourth embodiment of a cover according to certain implementations.

FIG. 6 illustrates a fourth embodiment of a cover 103. The cover 103 differs from the cover 100 of FIGS. 1 through 3 in that the film layer 110 of the cover 103 includes a smaller surface area and a smaller diameter compared to the film layer 110 of the cover 100, resulting in less of the film layer 110 being exposed from the rigid or semi-rigid layer 120, assuming such layers have the same size across embodiments. For instance, the film layer 110 of the cover 103 may have a diameter of 24 inches, while the rigid or semi-rigid layer 120 may have a diameter of 22 inches, resulting in about 1 inch of the film layer 110 being exposed around the outer circumference of the cover 103; whereas the film layer 110 of the cover 101 may have a diameter of 26 inches, and with the same sized rigid or semi-rigid layer 120, about 2 inches of the film layer would be exposed around the outer circumference of the cover 101.

Figure 7:
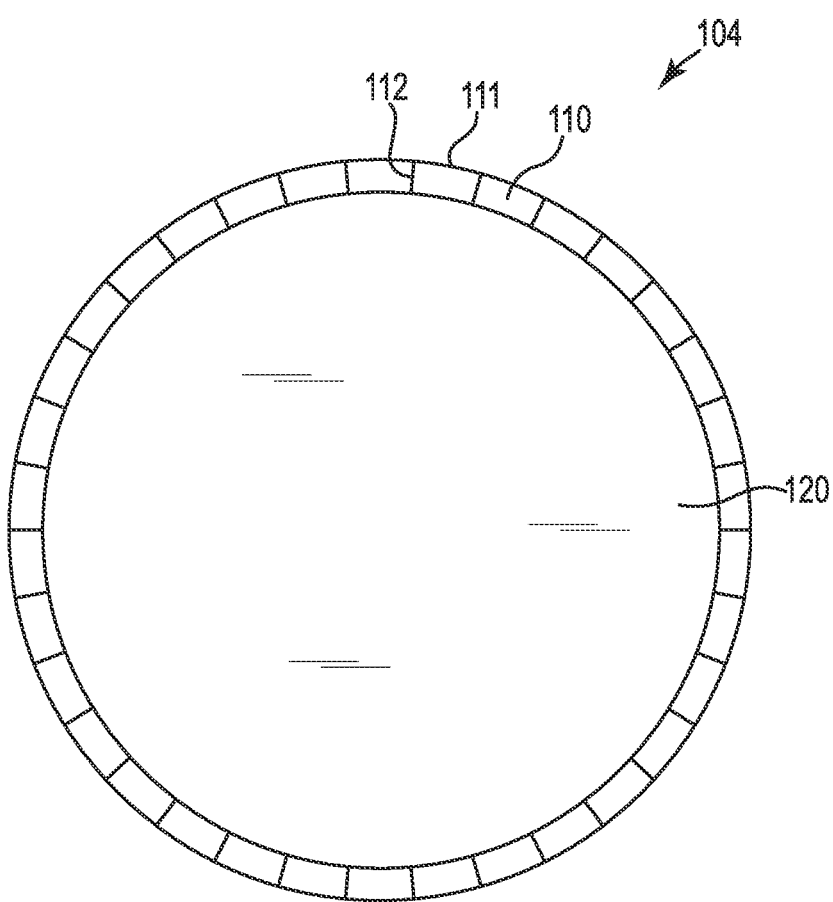
FIG. 7 illustrates a fifth embodiment of a cover according to certain implementations.

FIG. 7 illustrates a fifth embodiment of a cover 104. The cover 104 differs from cover 101 of FIG. 4 in that the plurality of tabs 111 in FIG. 6 have a shorter width compared to the tabs of the cover 101. A width of the tabs 111 may be about 1 inch and may be defined by the length the film layer 110 exposed from the rigid or semi-rigid layer 120.

Figure 8:
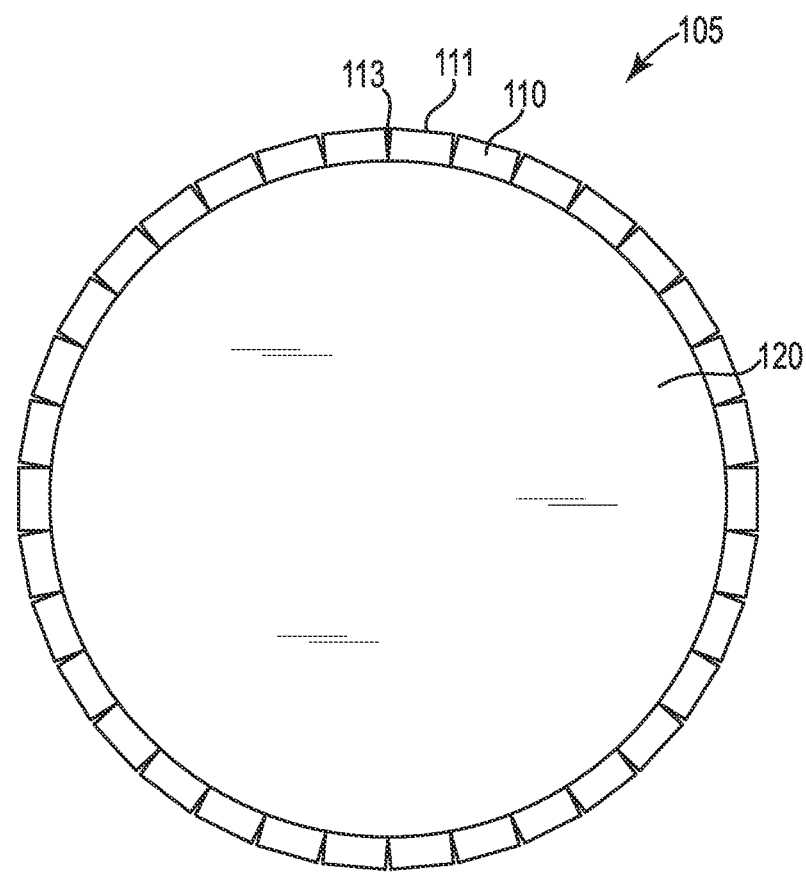
FIG. 8 illustrates a sixth embodiment of a cover according to certain implementations.

FIG. 8 illustrates a sixth embodiment of a cover 105. The cover 105 differs from the cover 102 of FIG. 5 in that the plurality of tabs 111 have a shorter width compared to the tabs of cover 102. More particularly, the wedge-shaped notches 113 may have a shorter depth, such as about 1 inch, resulting in the tabs 111 having a substantially rectangular shape.

The arrangement of the film layer 110 relative to the rigid or semi-rigid layer 120 may advantageously provide the covers 100-105 with the rigidity of the rigid or semi-rigid layer 120 for ease of handling by an operator during placement of the covers 100-105 on surfaces and mechanical strength during stacking of the tubs, and with the flexibility of the film layer 110 that allows the covers 100-105 to conform to irregular surfaces, form a seal with the animal feed, and assist with covering the entirety of the top layer of animal feed in cases of fill height variability within the container. Tabs 111, when present, may further facilitate the film layer 110 conforming to surfaces such as the exposed surface of the animal feed at the outer circumference of the feed tub 200 and the sidewall 210 of the feed tub. When defined by wedge-shaped notches 113, the tabs 111 may more easily overlap one another when conforming to irregular surfaces, such as when the cover's outer circumference is larger than an inner circumference of the sidewall 210 of the feed tub 200. Although various embodiments of the covers 100-105 have been shown and described, it will be understood that the covers may be configured in various ways. For instance, the slits 112 or the v-shaped cut-outs 113 defining the tabs of the film layer 110 may be longer or shorter, may extend past the rigid or semi-rigid layer 120, may be further defined within the rigid or semi-rigid layer 120, and so on. Further, the V-shaped cut-outs 113 may be wider or narrower or may not be V-shaped. For instance, square or semi-circular-shaped cut-outs may define the tabs 111. Moreover, instead of having edges defined by slits 111 or defined by right angles in the case of V-shaped cut-outs 113, the edges of the tabs 111 may have any configuration suitable for conforming to irregular surfaces and for covering the animal feed. For instance, the edges may be scalloped.

As discussed, the feed tub 200 used in connection with the cover 100 may have a circular inner circumference. Such feed tubs may be cylindrically-shaped or frustoconically-shaped. However, feed tubs may have any geometric shape, e.g., octagon, heptagon, hexagon, pentagon, square, triangle, and further, the feed tub opening may be shaped similarly or may have a different configuration than that of the tub body. The feed tub opening may optionally include a lip, such as a rounded lip, and handles, such as protruding bodies, recessed bodies or openings defined proximate the opening that are configured for gripping. Such handles may be separated by 180 degrees. The container may optionally include sidewall openings or handles joined to the sidewalls. In the implementation of FIG. 1, the feed tub is configured with a frustoconical shape having a circular opening, a rounded lip and handles. An exemplary feed tub is a 27 or 28 gallon tub with a height of 16 to 20 inches and a top diameter of about 20 to 24 inches. A diameter of the tub at a fill line proximate a top portion of the tub is about 0.5 inches smaller than the top diameter.

A method of applying a cover (e.g., covers 100-105) to animal feed within a container (e.g., feed tub 200) may involve depositing an animal feed in an open end of the container. The animal feed may be a mixture of animal feed components and may be in a liquid or slurry form. Upon filling the container, the animal feed mixture settles and a layer of the animal feed is exposed at the container opening. The exposed layer may include irregular surface structures due to feed components positioned at the top of the mixture and/or due to the mixture having a high viscosity. Depending on the production process for the animal feed, the exposed feed layer may be at elevated temperatures such as about 125° F. to about 185° F. For instance, the animal feed may be heated to temperatures of about 155° F. to about 175° F. and poured directly into the container. Alternatively, the animal feed may be of the type that undergoes an exothermic reaction for product hardening, such as a mixture containing magnesium oxide. During exotherming, the mixture reaches temperatures of up about 185° F. within the container. In prior approaches, these elevated temperatures prevented placement of covers over the open end of the container due to damage caused to the covers. More particularly, due to the product being stacked, the tubs are nested, and stacking too quickly after depositing the mixture will damage the product that has not yet hardened. However, the covers of the present disclosure are adapted to be used at such elevated temperatures. Accordingly, the cover may be positioned on the exposed surface of the animal feed at the open end of the container when a temperature of the animal feed is at or above 125° F., above 155° F. or higher, and up to about 200° F. For instance, an operator holding onto the cover via a rigid or semi-rigid layer (e.g., rigid or semi-rigid layer 120) places the cover into the open end of the container so that the film of the cover (e.g., film 110) overlays the animal feed and the rigid or semi-rigid layer faces away from the animal feed. As the cover is placed on the exposed surface of the animal feed, the film conforms with and seals against the surface of the animal feed. Further, the covered container may be stacked and cover, with its rigid or semi-rigid layer, prevents the product from mechanical damage by the bottom of another container stacked atop the cover.

According to certain implementations, a surface of the film layer facing the animal feed may include a heat-activated and/or a flowable coating, and upon placing the cover atop the animal feed, the cover may be subjected to elevated temperatures to cause the flowable coating to be activated and reach a flow temperature of about 125° F. to about 165° F. More particularly, the animal feed deposited within the container may be at the described elevated temperatures, and may result in thermal energy being transmitted to the flowable coating causing it to reach the flow temperature. At this temperature, the flowable coating establishes a bond with the animal feed, thereby further establishing a seal between the cover and the animal feed. In addition or alternatively, an external heat source may be applied to the cover to cause the flowable coating to reach a flow temperature and facilitate bonding with the animal feed and forming a seal. In addition to bonding with the animal feed, the flowable coating may facilitate pulling the cover onto the animal feed and further may facilitate reduction of lift by the cover during shipment and handling.

In implementations where a portion of the outer circumferential portion of the cover is larger than the container circumference, the cover may fold against the container sidewall or may overlap with itself, e.g., via overlapping tabs. In this case, the cover may optionally adhere to the container sidewalls or to itself so as to both protect the animal feed within the container and further establish bonds that facilitate retaining the cover in a protective position.

The cover and the animal feed within the container may cool to room temperature where the animal feed hardens into a block and the cover further binds to and seals the animal feed block within the container. This is in contrast to prior approaches in which the cover was applied after the animal feed within the container had sufficiently cooled or reached room temperature, during which time the animal feed was subject to moisture loss and damage.

Production of animal feeds such as animal feed blocks using the methods described herein improves production efficiency due to the ability to cover the animal feed at elevated temperatures. By placing the cover over the animal feed shortly after pouring the hot mixture into the container, the filled and covered containers can be palletized and readied for shipment before the animal feed cools to room temperature. This results in freeing-up production space, which allows for faster production.

Upon readying the animal feed block for consumption by animals, the cover may be removed by a user. Particularly, due to the flexibility of the film layer and the rigid or semi-rigid layer, the cover may be peeled off of the animal feed. In some implementations, a coating of the film layer, such as the flowable coating, may be released onto the animal feed upon removal of the cover. Alternatively, the coating of the film layer may be carried with the cover upon removal. In some approaches, a thin coating of fat or molasses may be deposited over the animal feed just prior to applying the cover in order to assist removal of the cover.

As used herein, the term "about" modifying, for example, the quantity of a component in a composition, concentration, and ranges thereof, employed in describing the embodiments of the disclosure, refers to variation in the numerical quantity that can occur, for example, through typical measuring and handling procedures used for making compounds, compositions, concentrates or use formulations; through inadvertent error in these procedures; through differences in the manufacture, source, or purity of starting materials or ingredients used to carry out the methods, and like proximate considerations. The term "about" also encompasses amounts that differ due to aging of a formulation with a particular initial concentration or mixture, and amounts that differ due to mixing or processing a formulation with a particular initial concentration or mixture. Where modified by the term "about," the claims appended hereto include equivalents to these quantities.

Similarly, it should be appreciated that in the foregoing description of example embodiments, various features are sometimes grouped together in a single embodiment for the purpose of streamlining the disclosure and aiding in the understanding of one or more of the various aspects. These methods of disclosure, however, are not to be interpreted as reflecting an intention that the claims require more features than are expressly recited in each claim. Rather, as the following claims reflect, inventive aspects lie in less than all features of a single foregoing disclosed embodiment, and each embodiment described herein may contain more than one inventive feature.

Although the present disclosure provides references to preferred embodiments, persons skilled in the art will recognize that changes may be made in form and detail without departing from the spirit and scope of the invention.

What is claimed is:

1. A method of covering an animal feed product, comprising:
    depositing in an open end of a container an animal feed that utilizes an exothermic reaction for hardening;
    placing a cover on an exposed surface of the feed at the open end of the container, the cover comprising a flowable coating arranged on one side of a flexible film and a rigid or semi-rigid layer bound to an opposite side of the film, wherein the exposed surface of the feed comprises irregular surface structures due to feed components positioned at the exposed surface,
    wherein a central portion of the flexible film of the placed cover conforms to the irregular surface structures at the exposed surface of the feed and the flowable coating of the cover forms a seal with the animal feed undergoing the exothermic reaction upon the flowable coating reaching a temperature of at least about 125° F. and binding with the feed.

2. The method of claim 1, wherein an outer circumference of the film is substantially similar to an inner circumference of the open end of the container such that the film contacts, or is proximate, a circumferential sidewall of the container upon placement of the cover on the exposed surface of the feed product.

3. The method of claim 2, wherein the film is larger relative to the rigid or semi-rigid layer, and wherein the film and the rigid or semi-rigid layer are concentrically arranged.

4. The method of claim 2, wherein the film comprises a plurality of radial slits or notches arranged along an outer circumference, the radial slits or notches adapted to facilitate the film conforming to the exposed surface of the feed at the outer circumference of the container.

5. The method of claim 4, wherein the film and the rigid or semi-rigid layer are concentrically arranged.

6. The method of claim 1, wherein the cover is removable.

7. The method of claim 6, wherein the flowable coating is adapted to be carried with the cover upon removal of the cover.

8. The method of claim 6, wherein the flowable coating is adapted to remain on the feed upon removal of the cover.

9. A method of covering an animal feed product, comprising:

depositing an animal feed in an open end of a container;

placing a cover on an exposed surface of the feed at the open end of the container, the cover comprising a flowable coating arranged on one side of a flexible film and a rigid or semi-rigid layer bound to an opposite side of the film, wherein the exposed surface of the feed comprises irregular surface structures due to feed components positioned at the exposed surface; and applying heat to the cover to cause the flowable coating to reach a flow temperature of at least about 125° F.;

wherein a central portion of the flexible film of the placed cover conforms to the irregular surface structures at the exposed surface of the feed and the flowable coating of the cover forms a seal with the animal feed upon the flowable coating reaching the flow temperature and binding with the feed.

\* \* \* \* \*